United States Patent
Dokken et al.

(10) Patent No.: US 10,769,239 B2
(45) Date of Patent: Sep. 8, 2020

(54) SYSTEM FOR MONITORING A MARITIME ENVIRONMENT (71) Applicants: MARITIME RADAR SYSTEMS LIMITED, George Hill (AI); G.M.S. GLOBAL MARITIME SERVICES LTD., Macclesfield Cheshire (GB)

(72) Inventors: Sverre Dokken, George Hill (AI); Andre Bos, George Hill (AI); Jacek Gruszka, George Hill (AI)

(73) Assignees: MARITIME RADAR SYSTEMS LIMITED, George Hill (AI); G.M.S. GLOBAL MARITIME SERVICES LTD., Macclesfiel d Cheshire (GB)

( * ) Notice: Subject to any disclaimer, the term of this patent is extended or adjusted under 35 U.S.C. 154(b) by 558 days.

(21) Appl. No.: 15/531,108

(22) PCT Filed: Nov. 26, 2015

(86) PCT No.: PCT/EP2015/077744
§ 371 (c)(1),
(2) Date: May 26, 2017

(87) PCT Pub. No.: WO2016/083492
PCT Pub. Date: Jun. 2, 2016

(65) Prior Publication Data
US 2018/0336308 A1 Nov. 22, 2018

(30) Foreign Application Priority Data

Nov. 26, 2014 (EP) .................................. 14194865

(51) Int. Cl.
*G01S 13/937* (2020.01)
*G01S 7/00* (2006.01)
(Continued)

(52) U.S. Cl.
CPC ................ *G06F 19/00* (2013.01); *G01S 5/02* (2013.01); *G01S 7/003* (2013.01); *G01S 7/40* (2013.01);
(Continued)

(58) Field of Classification Search
None
See application file for complete search history.

(56) References Cited

U.S. PATENT DOCUMENTS 6,319,376 B1   11/2001   Graser et al.
6,774,837 B2   8/2004    Barrick et al.
(Continued)

FOREIGN PATENT DOCUMENTS

CN   101738600 A   6/2010
EP   1965222 A2    9/2008
(Continued)

OTHER PUBLICATIONS

Extended European Search Report for corresponding European Application No. 14194865.3, dated Sep. 28, 2015.
(Continued)

*Primary Examiner* — John C Kuan
(74) *Attorney, Agent, or Firm* — Workman Nydegger (57) ABSTRACT A system for monitoring a maritime environment comprises a plurality of radio detection and ranging devices configured to perform a synchronous detection of a maritime environment object, to transmit a plurality of sensor signals respectively relating to a location of the maritime environment object over a communication network, and to receive a synchronization signal. Each radio detection and ranging device is configured to synchronize its operation according to the synchronization signal. A synchronization source is configured to generate the synchronization signal for synchronizing operations of radio detection and ranging
(Continued)

devices, and to provide the synchronization signal over the communication network to the radio detection and ranging devices. A processing device is configured to receive the plurality of sensor signals from the plurality of radio detection and ranging devices, and to determine the location of the object in the maritime environment upon the basis of the plurality of sensor signals.

17 Claims, 4 Drawing Sheets

(51) Int. Cl.
| | |
|---|---|
| G01S 13/87 | (2006.01) |
| G01S 13/95 | (2006.01) |
| G01S 7/40 | (2006.01) |
| G01S 5/02 | (2010.01) |
| G01S 13/88 | (2006.01) |
| G01S 13/56 | (2006.01) |
| G01S 7/41 | (2006.01) |
| G01S 13/50 | (2006.01) |
| G01S 13/06 | (2006.01) |
| G06F 19/00 | (2018.01) |
| G01S 13/86 | (2006.01) |

(52) U.S. Cl.
CPC .............. *G01S 13/86* (2013.01); *G01S 13/87* (2013.01); *G01S 13/937* (2020.01); *G01S 13/956* (2013.01); *G01S 7/415* (2013.01); *G01S 13/06* (2013.01); *G01S 13/505* (2013.01); *G01S 13/56* (2013.01); *G01S 13/878* (2013.01); *G01S 13/88* (2013.01); *G01S 2007/4039* (2013.01); *Y02A 90/18* (2018.01)

(56) References Cited

U.S. PATENT DOCUMENTS

| | | | |
|---|---|---|---|
| 7,012,560 | B2 | 3/2006 | Braeuchle et al. |
| 7,737,880 | B2 | 6/2010 | Vacanti |
| 8,180,507 | B2 | 5/2012 | Dokken |
| 9,041,590 | B2 | 5/2015 | Yanagi |
| 9,442,188 | B2 | 9/2016 | Rector et al. |
| 2003/0071751 | A1 | 4/2003 | Barrick et al. |
| 2004/0090363 | A1 | 5/2004 | Barrick et al. |
| 2005/0062615 | A1 | 3/2005 | Braeuchle et al. |
| 2005/0242985 | A1* | 11/2005 | Ponsford ................... G01S 7/36 342/59 |
| 2008/0165046 | A1 | 7/2008 | Fullerton et al. |
| 2009/0271054 | A1 | 10/2009 | Dokken |
| 2010/0097263 | A1 | 4/2010 | Vacanti |
| 2010/0177681 | A1* | 7/2010 | Sahinoglu ................. G01S 5/12 370/328 |
| 2011/0032141 | A1 | 2/2011 | Elleaume |
| 2012/0133546 | A1* | 5/2012 | Reiter .................. G01S 13/937 342/59 |
| 2012/0188125 | A1 | 7/2012 | Pomietlasz |
| 2012/0313807 | A1 | 12/2012 | Yanagi |
| 2013/0169809 | A1 | 7/2013 | Grignan et al. |
| 2013/0194126 | A1 | 8/2013 | Paoletti |
| 2016/0069992 | A1 | 3/2016 | Rector et al. |
| 2016/0109568 | A1 | 4/2016 | Aoyagi et al. |
| 2016/0266246 | A1* | 9/2016 | Hjelmstad ............. G01S 17/023 |

FOREIGN PATENT DOCUMENTS

| | | |
|---|---|---|
| EP | 2604478 A1 | 6/2013 |
| GB | 2393871 B | 2/2005 |
| GB | 2500931 A | 10/2013 |
| JP | 2000028705 A | 1/2000 |
| JP | 2000065923 A | 3/2000 |
| JP | 2001174547 A | 6/2001 |
| JP | 2002267745 A | 9/2002 |
| JP | 2002277533 A | 9/2002 |
| JP | 2003114275 A | 4/2003 |
| JP | 2003130951 A | 5/2003 |
| JP | 2003156557 A | 5/2003 |
| JP | 2003185742 A | 7/2003 |
| JP | 2003194933 A | 7/2003 |
| JP | 2005505074 A | 2/2005 |
| JP | 2005291806 A | 10/2005 |
| JP | 2006105897 A | 4/2006 |
| JP | 2008064673 A | 3/2008 |
| JP | 2008185447 A | 8/2008 |
| JP | 4204190 B2 | 1/2009 |
| JP | 2010503908 A | 2/2010 |
| JP | 2010101890 A | 5/2010 |
| JP | 2010204054 A | 9/2010 |
| JP | 2011141121 A | 7/2011 |
| JP | 2012042427 A | 3/2012 |
| JP | 2013002837 A | 1/2013 |
| JP | 2013228310 A | 11/2013 |
| JP | 2013231636 A | 11/2013 |
| JP | 2014006104 A | 1/2014 |
| JP | 2015180870 A | 10/2015 |
| JP | WO2014178131 A1 | 2/2017 |
| KR | 20100045987 A | 5/2010 |
| WO | 2010067057 A2 | 6/2010 |
| WO | 2013105093 A1 | 7/2013 |

OTHER PUBLICATIONS

Gad et al., "Data Fusion Architecture for Maritime Surveillance," Proceedings of the Fifth International Conference on Information Fusion, Jul. 8, 2002, pp. 448-455, vol. 1.

International Search Report for corresponding International PCT Application No. PCT/EP2015/077744, dated Jun. 15, 2016.

Megherbi et al., "A Distributed Multi-Agent Tracking, Awareness, and Communication System Architecture for Synchronized Real-Time Situational Understanding, Surveillance, Decision-Making, and Control," 2010 IEEE International Conference on Technologies for Homeland Security (HST), Nov. 8, 2010, pp. 549-555.

Megherbi et al., "A Distributed Multi-Agent Tracking, Awareness, and Communication System Architecture for Synchronized Real-Time Situational Understanding, Surveillance, Decision-Making, and Control," Technologies for Homeland Security (HST), IEEE International Conference, Nov. 8, 2010, pp. 549-555.

European Office Action from corresponding EP Application No. 14194865.3, dated Jan. 10, 2019.

Korean Office Action from KR Application No. 10-2017-7012471, dated Nov. 19, 2018.

Japanese Office Action from JP Application No. 2017-547070, dated Jun. 26, 2018.

Japanese Search Report from JP Application No. 2017-547070, dated Jun. 21, 2018.

* cited by examiner

SYSTEM FOR MONITORING A MARITIME ENVIRONMENT

TECHNICAL FIELD

The invention relates to the field of object detection in maritime environments.

BACKGROUND OF THE INVENTION

A detection of objects in maritime environments can be performed by different detection devices such as radio detection and ranging (radar) devices or sound navigation and ranging (sonar) devices. Radio detection and ranging devices may e.g. be adapted to monitor the maritime environment over long ranges on the water surface whereas sound navigation and ranging devices may e.g. be adapted to monitor the maritime environment at short ranges under the water surface.

Typical radio detection and ranging devices to be used in maritime environments operate as stand-alone devices in the X frequency band (8-12 GHz) or S frequency band (2-4 GHz). In a maritime vessel, typical radio detection and ranging devices may e.g. be arranged at a bow or a stern of the maritime vessel.

Due to limitations of stand-alone radio detection and ranging devices, e.g. a limited bandwidth or limited aperture, object detection in maritime environments suffers from a limited resolution of object detection and a coarse mitigation of sea clutter. Furthermore, no simultaneous full coverage around the maritime vessel and only a limited coverage in close areas around the maritime vessel may be provided.

SUMMARY OF THE INVENTION

It is the object of the invention to provide an efficient concept for monitoring a maritime environment.

This object is achieved by the features of the independent claims. Further implementation forms are apparent from the dependent claims, the description and the figures.

The invention is based on the finding that a plurality of radio detection and ranging devices can be synchronized and object detection can be performed centrally by a processing device. The plurality of radio detection and ranging devices can be employed for monitoring the maritime environment at short (0-500 meters), medium (100-2000 meters) and long ranges (above 50 kilometers) around a maritime vessel. The plurality of radio detection and ranging devices can further be employed for monitoring the maritime environment at very short ranges (0-100 meter) around the maritime vessel, e.g. for man-over-board detection.

For passively detecting electromagnetic signals, a plurality of receiving devices can be employed, wherein object detection can be based on a multilateration or triangulation technique. A further radio detection and ranging device can be employed to allow for object detection at long ranges, wherein the further radio detection and ranging device may not be synchronized to the plurality of radio detection and ranging devices.

According to an aspect, the invention relates to a system for monitoring a maritime environment, the system comprising a plurality of radio detection and ranging devices being configured to perform a synchronous detection of an object in the maritime environment, to transmit a plurality of sensor signals respectively relating to a location of the object in the maritime environment over a communication network, and to receive a synchronization signal, each radio detection and ranging device being configured to synchronize its operation according to the synchronization signal, a synchronization source being configured to generate the synchronization signal for synchronizing operations of the plurality of radio detection and ranging devices, and to provide the synchronization signal over the communication network to the plurality of radio detection and ranging devices, and a processing device being configured to receive the plurality of sensor signals from the plurality of radio detection and ranging devices, and to determine the location of the object in the maritime environment upon the basis of the plurality of sensor signals. Thus, an efficient concept for monitoring a maritime environment can be realized.

The maritime environment can relate to the environment of a marine seagoing vessel, e.g. a ship, or a marine stand-still platform, e.g. an oil production platform, an oil platform, or a gas platform. The maritime environment can further relate to the environment of a marine harbor or marine port. The maritime environment can relate to a maritime surrounding environment or a maritime sea state environment.

The object can be a marine seagoing vessel, e.g. a ship, or a marine non-moving stand-still platform, e.g. an oil production platform. The object can further be a floating obstacle. The object can further be an oil slick, and/or a dispersed oil spill.

The plurality of radio detection and ranging devices can be configured to perform a synchronous detection of an object on a water surface, or above a water surface. The plurality of radio detection and ranging devices can be dynamically configured to perform the synchronous detection. The configuration of the plurality of radio detection and ranging devices may change e.g. due to a malfunction or degradation of a radio detection and ranging device or due to a changing measurement situation. The plurality of sensor signals can be formatted according to a standardized format, e.g. a format standardized by the National Marine Electronics Association (NMEA).

The communication network can be configured to transfer the synchronization signal and the plurality of sensor signals. The communication network can be structured according to a star network architecture, a circular network architecture, a mesh network architecture, or a combination thereof. The communication network can comprise a synchronization network, wherein the communication network is configured to transfer the plurality of sensor signals, and wherein the synchronization network is configured to transfer the synchronization signal. The communication network can be flexibly reconfigured and/or arranged. The reconfiguration process can be executed concurrently with the object detection process.

The processing device can comprise a computer. The processing device can be configured to coherently process the plurality of sensor signals. The processing device can process the plurality of sensor signals in real-time. The processing device can be configured to execute a computer program.

The system can form a networked radio detection and ranging (radar) system. The system can be connected to sensors of a maritime vessel on which the system is installed, e.g. a speed sensor or a gyroscope. The information originating from the sensors can be used to further interpret the plurality of sensor signals of the system. For example, the sensors can be used to compute a Closest Point of Approach (CPA) or a Time to the Closest Point of Approach (TCPA). Another usage of the sensors can be a validation of the plurality of sensor signals of the system.

According to an implementation form, each radio detection and ranging device is configured to synchronously generate a transmit signal upon the basis of the synchronization signal, to transmit the transmit signal towards the object in the maritime environment, to receive a reflected signal, the reflected signal forming a reflected version of the transmit signal, and to generate a sensor signal upon the basis of the transmit signal and the reflected signal. Thus, the synchronous detection of the object can be performed efficiently.

The plurality of radio detection and ranging devices can be short range (SR) radio detection and ranging devices, medium range (MR) radio detection and ranging devices or long range (LR) radio detection and ranging devices. The short range radio detection and ranging devices can e.g. cover a range of up to approximately 0 to 60 or 100 m. The medium range (MR) radio detection and ranging devices or long range (LR) radio detection and ranging devices can e.g. cover a range of approximately 30 m to 1.8 or 2.0 km. The plurality of radio detection and ranging devices can operate in the S frequency band or other frequency bands, e.g. C or K frequency bands.

Each radio detection and ranging device can be a multi-beam radio detection and ranging device comprising a transmit beam and a plurality of receive beams. The transmit beam can be broad and each receive beam can be narrow. The plurality of receive beams can overlap. Each radio detection and ranging device can provide a fixed field of view or a dynamic field of view, e.g. using dynamic beam forming. Each radio detection and ranging device can provide a high temporal resolution. Each radio detection and ranging device can further be a multi-frequency radio detection and ranging device.

The transmit signal can be synchronously generated with regard to a reference time, a reference frequency, and/or a reference phase indicated by the synchronization signal. The transmit signal and the reflected signal can be frequency-modulated continuous-wave (FMCW) signals or pulsed (chirped) signals. The transmit signal can be modulated with an additional code. This additional code can be used to identify the transmit signal for further processing.

According to an implementation form, each radio detection and ranging device is configured to determine a Doppler frequency shift between the transmit signal and the reflected signal, and to generate the sensor signal upon the basis of the determined Doppler frequency shift. Thus, a movement of the object can be determined, and a direction of a transmit beam and a receive beam relative to the maritime vessel can be determined efficiently. The plurality of radio detection and ranging devices can be used for man-over-board (MOB) detection upon the basis of the determined Doppler frequency shift. A direction of movement of the object can be determined by a correlation between a direction of a transmit beam and a direction of a receive beam.

According to an implementation form, the plurality of radio detection and ranging devices is arranged to continuously monitor a predetermined azimuth range, in particular an azimuth range of 360°, and to perform the synchronous detection of the object in the maritime environment within the predetermined azimuth range. Thus, the maritime environment can continuously be monitored.

The plurality of radio detection and ranging devices can have overlapping transmit beams and/or receive beams. Therefore, a redundancy of object detection can be provided. The redundancy of object detection can be used to combine the detections and/or measurements and to improve a signal-to-noise ratio of object detection.

According to an implementation form, a first radio detection and ranging device of the plurality of radio detection and ranging devices is configured to provide a first sensor signal, wherein a second radio detection and ranging device of the plurality of radio detection and ranging devices is configured to provide a second sensor signal, and wherein the first radio detection and ranging device or the second radio detection and ranging device is configured to combine the first sensor signal with the second sensor signal. Thus, a pre-processing of the first sensor signal and/or the second sensor signal can be performed efficiently.

The first radio detection and ranging device and the second radio detection and ranging device can be arranged to form an outstation or a cluster. The second sensor signal can be forwarded by the first radio detection and ranging device. The first sensor signal can be forwarded by the second radio detection and ranging device, and vice versa.

According to an implementation form, the synchronization source comprises a global navigation satellite system (GNSS) receiver, a local oscillator, or a combination thereof, for generating the synchronization signal. Thus, the synchronization signal can be provided efficiently.

The GNSS receiver can be a GPS receiver, a GALILEO receiver, a GLONASS receiver and/or a COMPASS receiver. The synchronization signal can be derived from a GNSS signal received by the GNSS receiver. The synchronization signal can indicate a timing of object detection. The local oscillator can comprise an atomic clock, e.g. a Cesium atomic clock or a Rubidium atomic clock. The GNSS receiver can control or stabilize the local oscillator, e.g. a GPS disciplined local oscillator, using e.g. a phase-locked-loop (PLL) or an additional processing device. The additional processing device can also compensate for modeled effects of aging, temperature and other environmental parameters of the local oscillator.

According to an implementation form, the synchronization signal indicates a reference time, a reference frequency, or a reference phase, and each radio detection and ranging device is configured to synchronize its operation with regard to the reference time, the reference frequency, or the reference phase. Thus, the synchronous detection of the object can be performed efficiently. The synchronization signal can e.g. be a sine wave, or a rectangular wave. Further types of synchronization signals may also be employed. The synchronization signal can e.g. be a 1 PPS or 10 MHz reference signal.

The synchronization with regard to the reference time, the reference frequency, and/or the reference phase can enable a coherent processing of the plurality of sensor signals by the processing device, e.g. a synthetic aperture radar (SAR) processing, an interferometric synthetic aperture radar (In-SAR) processing, and/or a beam-forming processing. The In-SAR processing may be based on two different passes. Two pass in-SAR processing may be enabled if the object passes two sets, e.g. 2 times 2, radio detection and ranging devices, e.g. alongside a maritime vessel. Interferometric processing may also be performed if two beams point into the same direction.

According to an implementation form, the processing device is configured to determine a speed, an acceleration, or a heading of the object in the maritime environment upon the basis of the plurality of sensor signals. Thus, a movement characteristic of the object can be determined efficiently. Movement characteristics may only be one of several characteristics which can be recognized by the processing.

Object or meteorological or oceanographic (MetOcean) characteristics, e.g. representing the backscatter of the object or the ocean, can be used for its characterization, e.g. object shape characteristics.

According to an implementation form, the processing device is configured to determine the location of the object in the maritime environment within a 3-dimensional Cartesian coordinate system. Thus, the location of the object can be visualized efficiently.

The processing device can be configured to derive a point cloud upon the basis of the plurality of sensor signals, wherein the point cloud can indicate the location of the object in the maritime environment. The location of the object can be determined continuously in time.

According to an implementation form, the processing device is configured to determine a meteorological or oceanographic parameter of the maritime environment upon the basis of the plurality of sensor signals, in particular an ocean current speed, an ocean current direction, an ocean wave height, an ocean wave period, an ocean wave spectrum, an ocean wave frequency, an ocean wave direction of propagation, an ocean speed, and/or a wind direction. Thus, the maritime environment can be characterized efficiently. The MetOcean-parameters can relate to MetOcean parameters of the maritime environment. The water current speed can be an ocean current speed; the water current direction can be an ocean current direction. The water wave height can be an ocean wave height; the water wave speed can be an ocean wave speed; the water wave propagation direction can be an ocean wave propagation direction; the water wave period can be an ocean wave period; and the water wave spectrum can be an ocean wave spectrum.

According to an implementation form, the processing device is configured to combine the plurality of sensor signals using a state estimation filter, in particular a Kalman filter or a particle filter, to determine the location of the object in the maritime environment. Thus, physical boundary conditions regarding a movement characteristic, e.g. a speed or an acceleration, of the object can be considered. Specific movement characteristics can apply for man-over-board (MOB) detection, e.g. a typical speed, a typical acceleration, or a typical radar cross section of a human being.

The state estimation filter can be used to determine a track, e.g. indicating a location, a heading, and a speed, of the object. The state estimation filter can further assign a likelihood to the track upon the basis of the movement characteristic of the object. The state estimation filter can be applied to reduce a false alarm rate, e.g. due to sea clutter, of object detection.

According to an implementation form, the plurality of radio detection and ranging devices comprises a surveillance radio detection and ranging device and a man-over-board radio detection and ranging device, wherein the processing device is configured to combine the plurality of sensor signals using a state estimation filter, in particular a Kalman filter or a particle filter, to determine the location of the object in the maritime environment. Thus, sensor signals from different types of radio detection and ranging devices connected to the system can be employed.

The surveillance radio detection and ranging device can be a short range (SR) radio detection and ranging device, a medium range (MR) radio detection and ranging device, or a long range (LR) radio detection and ranging device. The man-over-board (MOB) radio detection and ranging device can be configured to detect a human falling overboard.

The state estimation filter can be used to determine a track, e.g. an indication of a location, a heading, and a speed, of the object. The state estimation filter can further assign a likelihood to each track upon the basis of the movement characteristic of the object. The state estimation filter can be applied to reduce a false alarm rate of object detection, e.g. due to sea clutter. The state estimation filter can be implemented in such a way that multiple objects can be tracked concurrently.

According to an implementation form, the processing device is configured to detect a malfunction of a radio detection and ranging device of the plurality of radio detection and ranging devices upon the basis of the plurality of sensor signals, and to generate an indicator signal indicating the malfunction of the radio detection and ranging device. Thus, a system health monitoring can be realized. The malfunction can relate to a degradation of a functionality of a radio detection and ranging device. The malfunction can be due to contamination, corrosion, and/or adverse weather conditions. The processing device can also detect a malfunction of the processing device itself, the communication network, or any other sensor connected to the system, e.g. a ship born or a part of the system. Thus the health monitoring can be extended to the entire system.

The processing device can determine a signal-to-noise ratio of a sensor signal of the plurality of sensor signals for detecting the malfunction. The processing device can be configured to determine the location of the object in the maritime environment further upon the basis of the indicator signal. The indicator signal can e.g. indicate a probability of a successful synchronous detection of the object.

The system can be reconfigured upon the basis of the indicator signal. The reconfiguration can relate to a reconfiguration of the structure of the communication network, a functionality of a computer program executed by the system, or a setting of any of the radio detection and ranging devices of the system. A radio detection and ranging device of the plurality of radio detection and ranging devices can e.g. be activated or deactivated upon the basis of the indicator signal.

According to an implementation form, the system further comprises a plurality of receiving devices being configured to perform a synchronous reception of an electromagnetic signal originating from a further object in the maritime environment, to transmit a plurality of receiving signals respectively relating to a location of the further object in the maritime environment over the communication network, and to receive a further synchronization signal, each receiving device being configured to synchronize its operation according to the further synchronization signal, wherein the synchronization source is configured to generate the further synchronization signal for synchronizing operations of the plurality of receiving devices, and to provide the further synchronization signal over the communication network to the plurality of receiving devices, and wherein the processing device is configured to receive the plurality of receiving signals from the plurality of receiving devices, and to determine the location of the further object in the maritime environment upon the basis of the plurality of receiving signals. Thus, electromagnetic signals can be detected passively. The processing device can be configured to coherently process the receiving signals.

The plurality of receiving devices can e.g. operate in the maritime VHF or UHF or L-band. The electromagnetic signals can be detected in the maritime environment over large ranges, e.g. up to 100 nautical miles.

The further object can be illuminated by electromagnetic signals of opportunity. The electromagnetic signals of opportunity may e.g. be transmitted by a radio detection and ranging device of a further maritime vessel. In case of a plurality of maritime vessels in a convoy, the electromagnetic signals of opportunity can originate from different systems or sensor networks arranged at different maritime vessels. Thus, the radio detection and ranging devices can be working in bi-static mode. The plurality of maritime vessels in the convoy can cooperate in order to obtain an improved probability of detection. That is, the system may not only evaluate reflections of the transmit beam that point back to the maritime vessel, but can also use reflections that point away from the maritime vessel. The corresponding transmit signals and receive signals of the radio detection and ranging devices can be coded by a coding sequence to distinguish between the different maritime vessels.

An omnidirectional antenna or a directional antenna can be employed in order to receive a direct electromagnetic wave and a reflected electromagnetic wave. The processing device can be configured to correlate an associated direct signal with an associated reflected signal using a passive radar technique. The location of the further object can be determined as a relative location with regard to a location of the system.

According to an implementation form, a first receiving device of the plurality of receiving devices is configured to provide a first receiving signal, wherein a second receiving device of the plurality of receiving devices is configured to provide a second receiving signal, and wherein the processing device is configured to determine a time difference between a reception of the electromagnetic signal by the first receiving device and a reception of the electromagnetic signal by the second receiving device upon the basis of the first receiving signal and the second receiving signal. Thus, a time difference of arrival (TDOA) estimation can be performed.

The time difference can e.g. be determined using a cross-correlation scheme or a model-based scheme. The location of the further object can be determined by multilateration and/or by triangulation.

According to an implementation form, the processing device is configured to detect a malfunction of a receiving device of the plurality of receiving devices upon the basis of the plurality of receiving signals, and to generate a further indicator signal indicating the malfunction of the receiving device. Thus, a system health monitoring can be realized. The malfunction can relate to a degradation of a functionality of a receiving device. The malfunction can be due to contamination, corrosion, and/or adverse weather conditions.

The processing device can determine a signal-to-noise ratio of a receiving signal of the plurality of receiving signals for detecting the malfunction. The processing device can be configured to determine the location of the further object in the maritime environment further upon the basis of the further indicator signal. The further indicator signal can e.g. indicate a probability of a successful synchronous reception of the electromagnetic signal originating from the further object.

The system can be reconfigured upon the basis of the further indicator signal. The reconfiguration can relate to a reconfiguration of the structure of the communication network, a functionality of a computer program executed by the system, or a setting of a receiving device. A receiving device of the plurality of receiving devices can e.g. be activated or deactivated upon the basis of the further indicator signal.

According to an implementation form, the system further comprises a further radio detection and ranging device being configured to perform a detection of the object in the maritime environment, and to transmit a further sensor signal relating to the location of the object in the maritime environment over the communication network, wherein the processing device is configured to receive the further sensor signal from the further radio detection and ranging device, and to determine the location of the object in the maritime environment upon the basis of the further sensor signal. Thus, a further radio detection and ranging device can be used for an initial detection of the object.

The further radio detection and ranging device can be a maritime navigation radar. The further radio detection and ranging devices can operate in the X or S frequency band. The further radio detection and ranging device can be configured to perform a detection of the object over medium to long ranges, e.g. 0.5 nautical miles to 25 nautical miles or more. The further radio detection and ranging device may not be synchronized with regard to the plurality of radio detection and ranging devices. The further radio detection and ranging device can be a non-conventional radio detection and ranging device.

According to an implementation form, the plurality of radio detection and ranging devices comprises a surveillance radio detection and ranging device and a man-over-board radio detection and ranging device. Thus, different types of radio detection and ranging devices can be employed.

The surveillance radio detection and ranging device can be a short range (SR) radio detection and ranging device, a medium range (MR) radio detection and ranging device, or a long range (LR) radio detection and ranging device. The man-over-board (MOB) radio detection and ranging device can be configured to detect a human falling overboard.

According to an aspect, the invention relates to a method for monitoring a maritime environment, the method comprising generating a synchronization signal by a synchronization source for synchronizing operations of a plurality of radio detection and ranging devices, providing the synchronization signal over a communication network by the synchronization source to the plurality of radio detection and ranging devices, receiving the synchronization signal by the plurality of radio detection and ranging devices, synchronizing an operation of each radio detection and ranging device according to the synchronization signal, performing a synchronous detection of an object in the maritime environment by the plurality of radio detection and ranging devices, transmitting a plurality of sensor signals respectively relating to a location of the object in the maritime environment over the communication network by the plurality of radio detection and ranging devices, receiving the plurality of sensor signals from the plurality of radio detection and ranging devices by a processing device, and determining the location of the object in the maritime environment upon the basis of the plurality of sensor signals by the processing device. Thus, an efficient concept for monitoring a maritime environment can be realized.

The method can be performed by the system. Further features of the method can directly result from the functionality of the system.

According to an aspect, the invention relates to a computer program comprising a program code for performing the method when executed on a computer. Thus, the method can be performed in an automatic and repeatable manner. The processing device can be programmably arranged to execute the computer program.

The invention can be implemented in hardware and/or software.

BRIEF DESCRIPTION OF THE DRAWINGS

Further implementation forms of the invention will be described with respect to the following figures, in which.

DETAILED DESCRIPTION OF IMPLEMENTATION FORMS OF THE INVENTION

Figure 1:
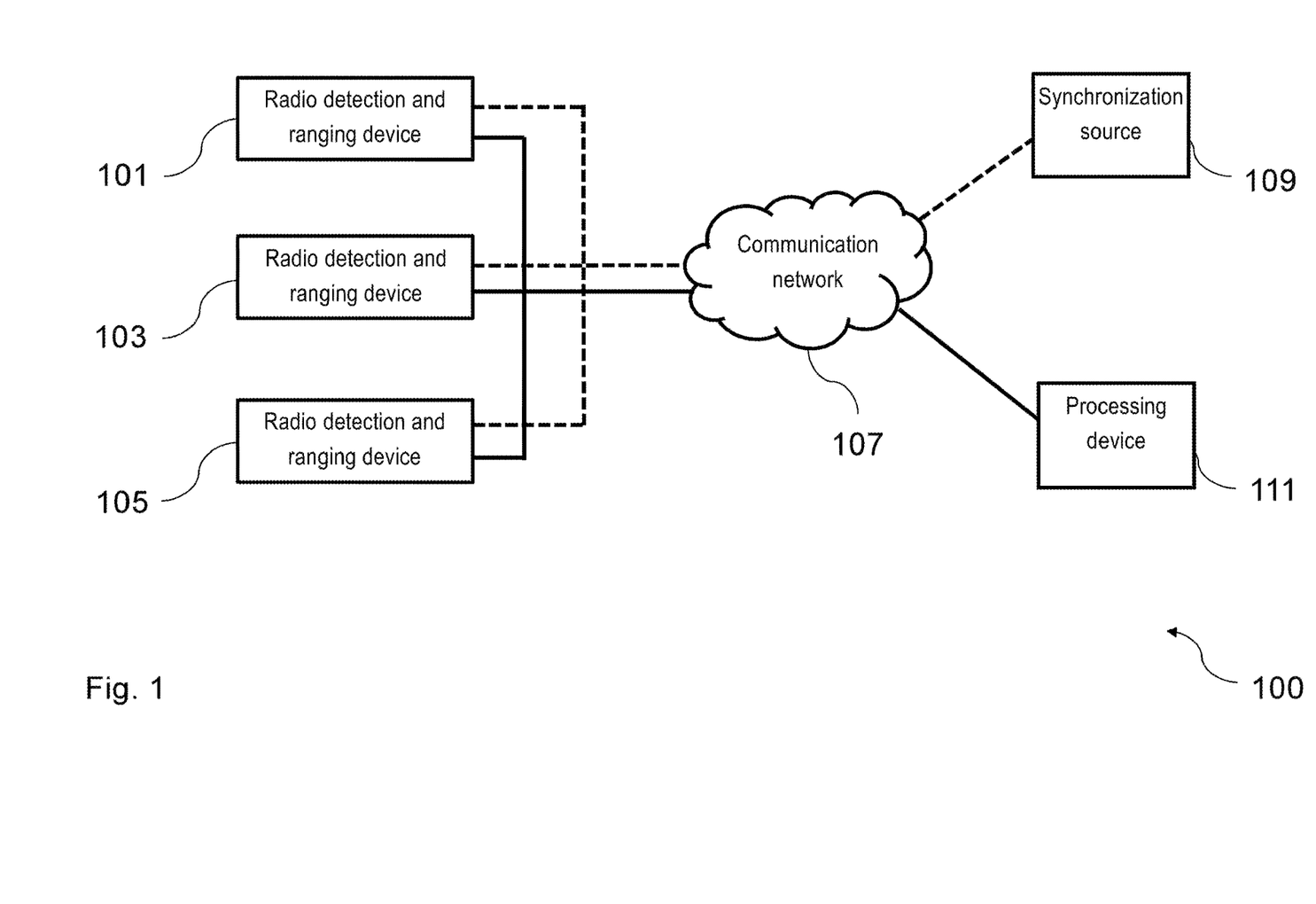
FIG. 1 shows a diagram of a system for monitoring a maritime environment according to an implementation form.

FIG. 1 shows a diagram of a system 100 for monitoring a maritime environment according to an implementation form.

The system 100 comprises a plurality of radio detection and ranging devices 101, 103, 105 being configured to perform a synchronous detection of an object in the maritime environment, to transmit a plurality of sensor signals respectively relating to a location of the object in the maritime environment over a communication network 107, and to receive a synchronization signal, each radio detection and ranging device 101, 103, 105 being configured to synchronize its operation according to the synchronization signal, a synchronization source 109 being configured to generate the synchronization signal for synchronizing operations of the plurality of radio detection and ranging devices 101, 103, 105, and to provide the synchronization signal over the communication network 107 to the plurality of radio detection and ranging devices 101, 103, 105, and a processing device 111 being configured to receive the plurality of sensor signals from the plurality of radio detection and ranging devices 101, 103, 105, and to determine the location of the object in the maritime environment upon the basis of the plurality of sensor signals.

Figure 2:
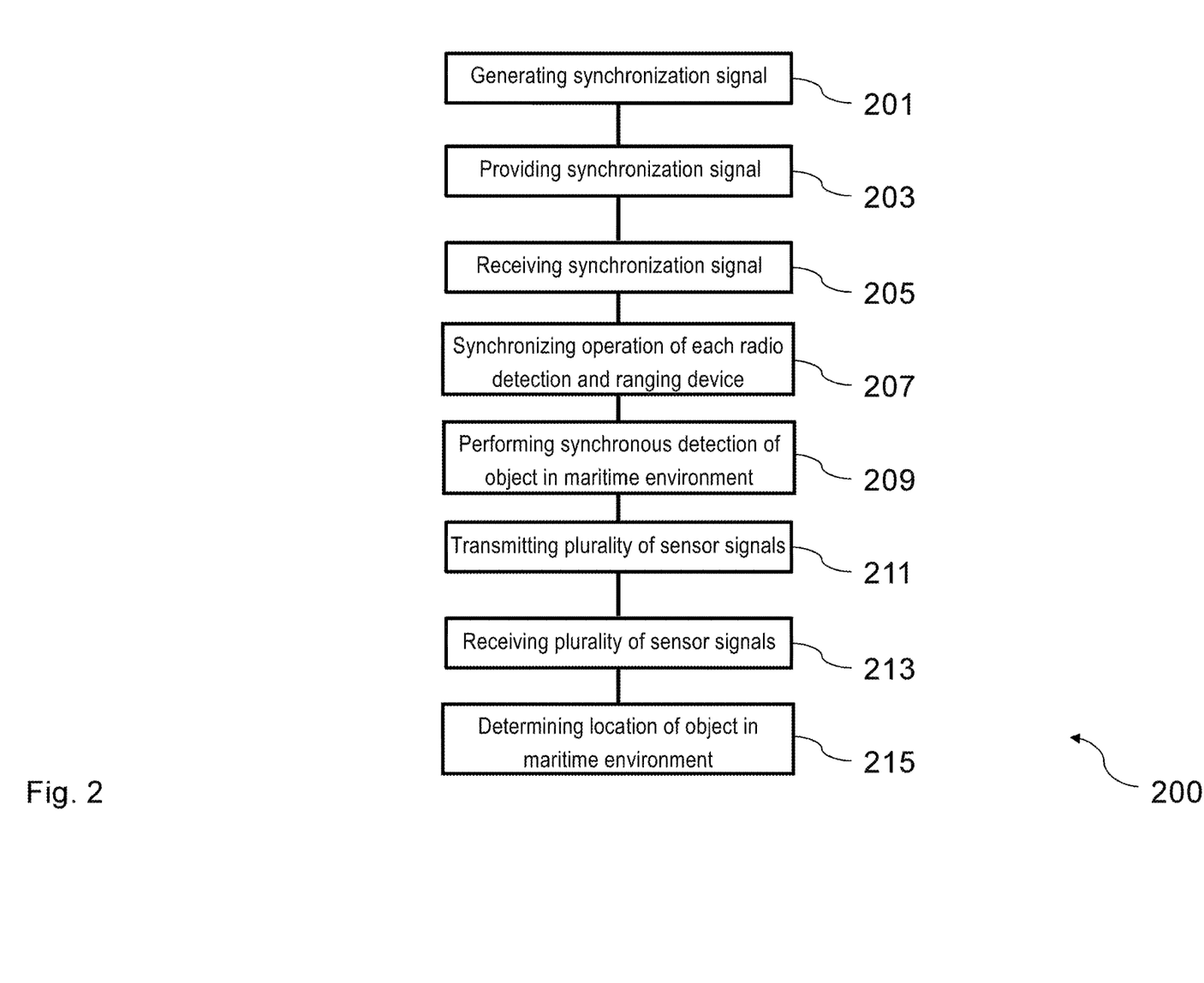
FIG. 2 shows a diagram of a method for monitoring a maritime environment according to an implementation form.

FIG. 2 shows a diagram of a method 200 for monitoring a maritime environment according to an implementation form.

The method 200 comprises generating 201 a synchronization signal by a synchronization source for synchronizing operations of a plurality of radio detection and ranging devices, providing 203 the synchronization signal over a communication network by the synchronization source to the plurality of radio detection and ranging devices, receiving 205 the synchronization signal by the plurality of radio detection and ranging devices, synchronizing 207 an operation of each radio detection and ranging device according to the synchronization signal, performing 209 a synchronous detection of an object in the maritime environment by the plurality of radio detection and ranging devices, transmitting 211 a plurality of sensor signals respectively relating to a location of the object in the maritime environment over the communication network by the plurality of radio detection and ranging devices, receiving 213 the plurality of sensor signals from the plurality of radio detection and ranging devices by a processing device, and determining 215 the location of the object in the maritime environment upon the basis of the plurality of sensor signals by the processing device.

Figure 3:
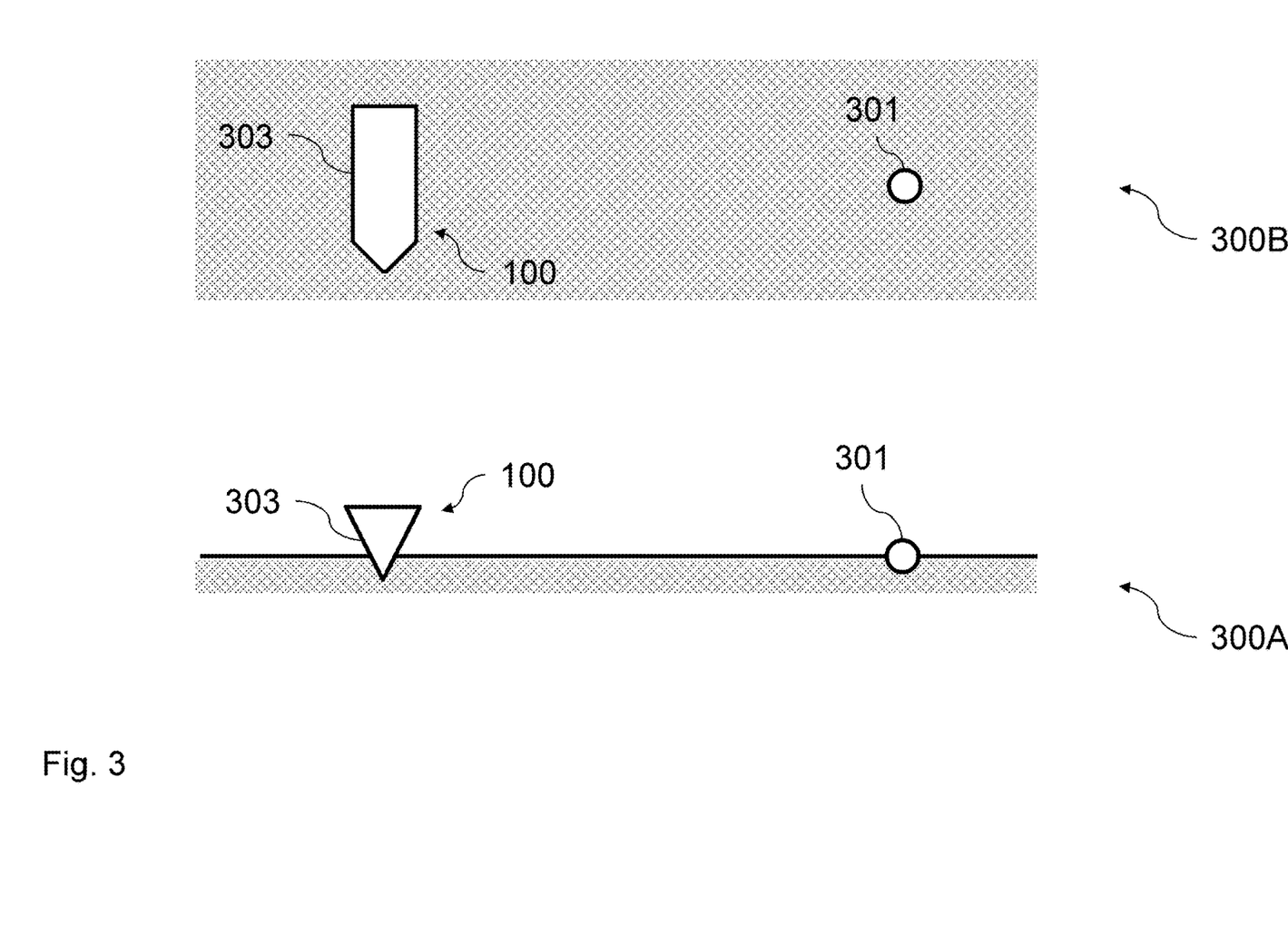
FIG. 3 shows diagrams of a monitoring scenario according to an implementation form.

FIG. 3 shows diagrams 300A, 300B of a monitoring scenario according to an implementation form. The diagram 300A illustrates the monitoring scenario from a side view. The diagram 300B illustrates the monitoring scenario from a top view.

The two diagrams 300A, 300B depict an object 301 and a maritime vessel 303 on a water surface. The system 100 is arranged on the maritime vessel 303 for monitoring the maritime environment.

The system 100 comprises a plurality of radio detection and ranging devices being configured to perform a synchronous detection of the object 301 in the maritime environment, to transmit a plurality of sensor signals respectively relating to a location of the object 301 in the maritime environment over a communication network, and to receive a synchronization signal, each radio detection and ranging device being configured to synchronize its operation according to the synchronization signal, a synchronization source being configured to generate the synchronization signal for synchronizing operations of the plurality of radio detection and ranging devices, and to provide the synchronization signal over the communication network to the plurality of radio detection and ranging devices, and a processing device being configured to receive the plurality of sensor signals from the plurality of radio detection and ranging devices, and to determine the location of the object 301 in the maritime environment upon the basis of the plurality of sensor signals.

Figure 4:
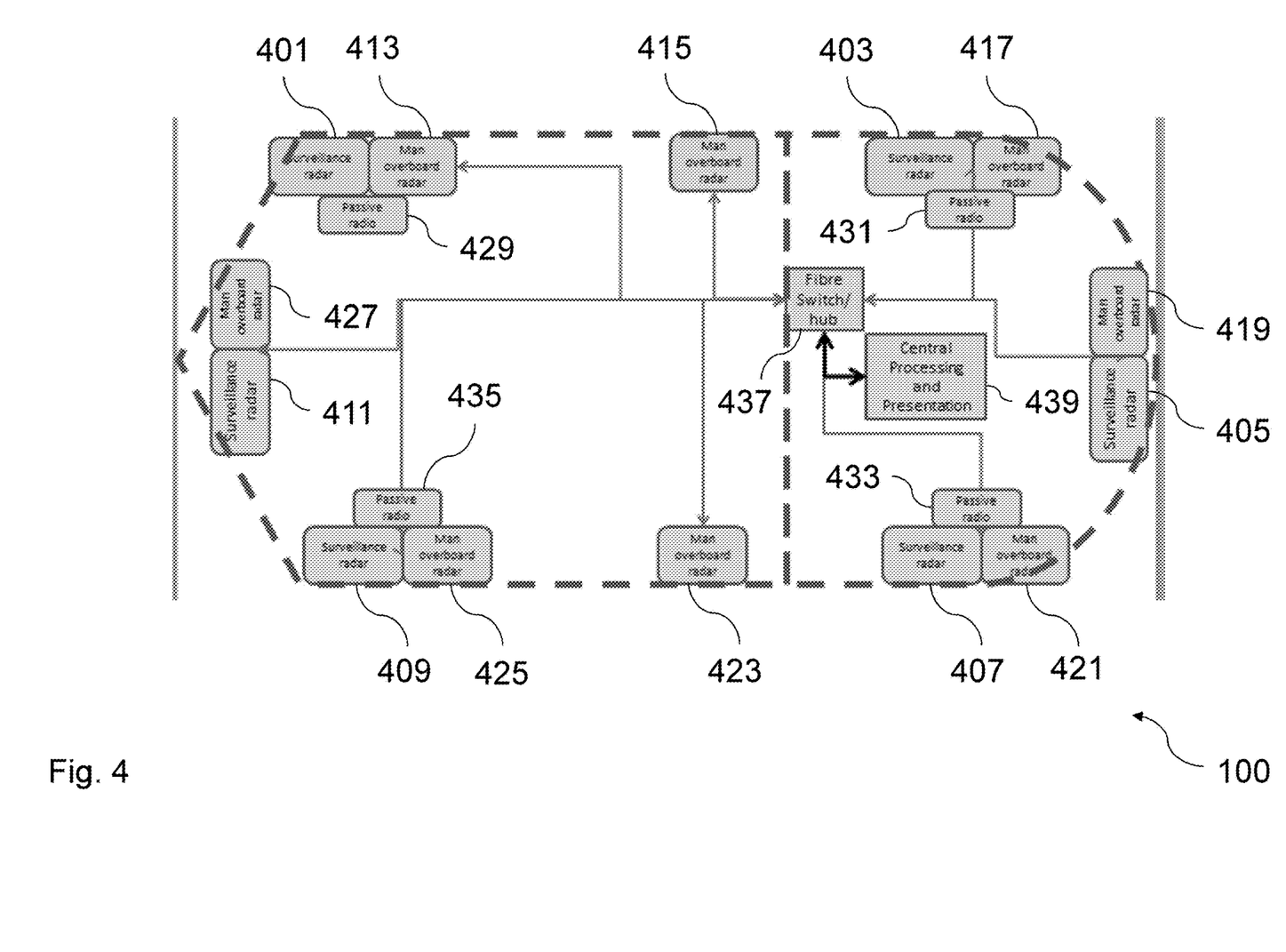
FIG. 4 shows a diagram of a system for monitoring a maritime environment according to an implementation form.

FIG. 4 shows a diagram of a system 100 for monitoring a maritime environment according to an implementation form. The system 100 comprises a plurality of surveillance radio detection and ranging devices 401-411, a plurality of man-over-board radio detection and ranging devices 413-427, a plurality of passive radio receiving devices 429-435, a fiber switch/hub 437, and a central processing and presentation device 439.

The plurality of surveillance radio detection and ranging devices 401-411 forms a possible implementation of the plurality of radio detection and ranging devices 101, 103, 105 as described in conjunction with FIG. 1. The plurality of man-over-board radio detection and ranging devices 413-427 forms a possible implementation of the plurality of radio detection and ranging devices 101, 103, 105 as described in conjunction with FIG. 1. The plurality of passive radio receiving devices 429-435 forms a possible implementation of the plurality of receiving devices. The fiber switch/hub 437 can be comprised by the communication network 107 as described in conjunction with FIG. 1. The central processing and presentation device 439 forms a possible implementation of the synchronization source 109 and the processing device 111 as described in conjunction with FIG. 1.

The system 100 can support navigation and operation of maritime vessels with improved object detection, man-overboard detection and/or vessel maneuvering in areas close to the maritime vessel and for ranges e.g. up to approximately 2000 m or 1 nautical mile.

The system 100 can comprise short- to mid-range radio detection and ranging devices operating in a high millimeter or centimeter wavelength range to provide anti-collision surveillance and detection of small to large objects from close up of the maritime vessel to a range of approximately 2000 m or 1 nautical mile depending of object characteristics, navigational support for docking, navigational support for dynamic positioning in sea cargo operation and in sea crane support, navigational support for emergency towing, e.g. keeping a correct distance to a towed object, surveillance and detection indication of approaching objects, e.g. high speed crafts, wave and current measurements, and/or oil spill detection. The system 100 can further comprise radio detection and ranging devices operating in a millimeter or centimeter or other wavelength ranges for man-overboard detection close to the maritime vessel.

The system 100 can further comprise passive radio receiving devices to detect further objects or transmitters in the maritime vessel surrounding, e.g. in ranges of 2000 m and more (up to 100 nautical miles), e.g. for detection support related to security and/or safety.

The central processing can comprise radar data processing for data analysis, passive radio information processing e.g. to obtain a bearing, distance and/or speed, information fusion between the radio detection and ranging devices and a further radio detection and ranging device, such as a conventional navigational radar, and/or presentation of combined data from all radio detection and ranging devices. The communication can e.g. be performed via a communication fiber network between the radio detection and ranging devices and the passive radio receiving devices.

The system 100 can comprise a plurality of clusters or outstations comprising the radio detection and ranging devices, the passive radio receiving devices, the further radio detection and ranging device, e.g. a conventional navigational radar, and/or an automatic identification system (AIS) receiver.

Each outstation or cluster can comprise a radio detection and ranging device covering an area near the maritime vessel e.g. from a few 10 meters up to 2 km, a radio detection and ranging device covering an area very close to the maritime vessel e.g. from 0 to a few 10 meters for man-over-board detection and for docking support, and/or a passive radio receiving device for detection of further objects or active radio transmitters in an area e.g. up to a few 10 kilometers.

The radio detection and ranging devices can be based on a phase controlled technology using a narrow beam lobe in order to handle sea clutter. A plurality of radio detection and ranging devices arranged around the maritime vessel can be used to provide a continuous full coverage. An exemplary arrangement of the radio detection and ranging devices and the receiving devices is indicated in the figure.

The radio detection and ranging devices can provide a high resolution object detection in the area near to the maritime vessel. A frequency of approximately 30 GHz, but also other frequencies, can e.g. be used. The passive radio receiving devices can comprise a multi-frequency scanner for detection of further objects or active radio transmitters in the area near to the maritime vessel up to e.g. a few tens of kilometers. The passive radio receiving devices can provide a direction and a range to the further object or active radio transmitter.

The detection results from the radio detection and ranging devices and the passive radio receiving devices can be transferred to a central processing device for signal decoding, multi-sensor fusion, and/or plot and track presentation. Multiple objects can be tracked concurrently.

The antennas can be coated by a film in order to provide an improved resistance with regard to contamination, corrosion, and/or adverse weather conditions. Phase array antennas can be used in conjunction with the radio detection and ranging devices such that a deployment can be done with 8, 16, 32, 64 or more array elements. Omnidirectional antennas can be used in conjunction with the receiving devices.

According to an implementation form, the radio detection ranging devices or sensors can be synchronized through an integrated communication network and/or synchronization network and can provide sensor signals to the processing device, which can be formed by a central processor, being configured to detect the location, speed, travel direction, and classification indication of objects and ocean surface phenomena. Different approaches for synchronization can be used for different radio detection and ranging devices in different parts of the communication network and/or synchronization network for operations, which may also be application dependent.

Regarding radio detection and ranging devices, e.g. medium (MR) or long range (LR) radio detection and ranging devices, inside an outstation or cluster, the radio detection and ranging devices can operate in outstations or clusters and can be distributed around the maritime vessel, e.g. ship or a maritime platform, e.g. an oil platform. In an outstation or cluster, the radio detection and ranging devices can be arranged close to the maritime vessel and may e.g. cover 40° each of up to a total angle of 160° or more. The radio detection and ranging devices can be interconnected with high speed connections, e.g. Gbit links, through a local Ethernet switch. The sensor signal delay for interaction between the devices can be very low.

The following synchronization approaches may be used. Firstly, a phase reference or frequency reference between the radio detection and ranging devices can be shifted permanently or slowly changing. Secondly, a frequency chirp shift synchronization can be applied. The operations of outstations or clusters can be synchronized as a function of real-time measurements, observations and/or sailing scenarios.

The radio detection and ranging devices, e.g. medium range (MR) or long range (LR) radio detection and ranging devices, can operate with two transmitters, e.g. forming a left and a right beam lobe, which may be coordinated between the radio detection and ranging devices in an outstation or cluster to provide the lobes at a maximum distance apart. The receivers of the radio detection and ranging devices can be synchronized with regard to a phase reference of the radio detection and ranging devices and can be able to discriminate between the radio detection and ranging devices based on the frequency used. The radio detection and ranging devices, e.g. medium range (MR) or long range (LR) radio detection and ranging devices, can further be synchronized between distributed outstations or clusters. The radio detection and ranging devices, e.g. the long range (LR) radio detection and ranging devices can be multi-beam radio detection and ranging devices.

Regarding the passive radio receiving devices, the receiving signals, e.g. the passive radio signals, can be coordinated and synchronized for the complete maritime vessel and the timing accuracy between different receiving devices or antennas can be in the nanoseconds range to be able to provide a high localization resolution. The receiving signals from the receiving devices or antennas can be transferred to the processing device for central handling. The passive receiving devices can be calibrated for the delay in the transmission media between a reception antenna and the central processing device.

Regarding the radio detection and ranging devices, e.g. the man-over-board radio detection and ranging devices, an operation in a Doppler modus can be performed.

A correlation and/or synchronization between medium range (MR) and/or long range (LR) radio detection and ranging devices and/or man-over-board (MOB) radio detection and ranging devices can optionally be applied. However, a local synchronization adapted to the functionality of any of the MR, LR or MOB radio detection and ranging devices may be used.

According to an implementation form, individual radio detection and ranging devices or a group of passive radio receiving devices can provide proposals for detected objects. The synchronization between the detections can be based on a recorded time, a range, and/or a heading of a detected object. Time synchronization may be performed over the communication network and may be combined with GPS timing signals. A network based time synchronization may use network time protocol (NTP). The timing accuracy when using NTP may be in a range below 1 ms.

Furthermore, an automatic identification system (AIS), a long range identification and tracking (LRIT) system, and/or a global maritime distress safety system (GMDSS) can be included in the system 100.

The structure of the system 100 can be based on a plurality of outstations or clusters located around a maritime vessel or platform which can be interconnected through a communication network in order to provide full and immediate area coverage around the maritime vessel.

Different radio detection and ranging devices, e.g. active general purpose radio detection and ranging devices or active specific purpose radio detection and ranging devices, can be used. Furthermore, different receiving devices, e.g. passive radio receiving devices or Radio Frequency Identification (RFID) related sensors, can be used. The RFID related sensors can be employed for man-over-board situations, wherein an RFID tag can be connected to members of the crew or passengers onboard of the maritime vessel, or to other onboard assets, wherein their locations can be assessed by the system. The RFID signals can then be received and transmitted by the RFID related sensors, e.g. acting as proximity sensors. The RFID signals of the RFID related sensors can allow the RFID tags to be localized precisely within the range of the different RFID related sensors.

An outstation or cluster structure can be dependent of a single radio detection and ranging device coverage, or a coverage of a plurality of radio detection and ranging devices for a total area to be covered at a specific location or surrounding of the maritime vessel. Typically, an outstation or cluster may include 0 to 3 long range (LR) radio detection and ranging devices, 0 to 2 man-over-board (MOB) radio detection and ranging devices and 0 to 1 passive radio receiving devices or antennas. Different configurations can be used also including further sensor types. The number of outstations and clusters can be dependent of the layout and size of the maritime vessel. A smaller boat, yacht or vessel may e.g. employ 1 to 4 outstations and/or clusters. A large vessel, for example a Very Long Crude Carrier (VLCC), may e.g. employ 5 to 10 outstations and/or clusters. A medium range (MR) or long range (LR) radio detection and ranging device can typically cover any combination from 40° to 360° individually or in a cluster.

The number of man-over-board (MOB) radio detection and ranging devices can be dependent of the layout shape and size of the maritime vessel since the complete sides of the maritime vessel may be covered, e.g. from 0 meters to 100 meters everywhere along a hull of the maritime vessel or platform. The passive radio receiving devices can e.g. be mounted in four location as far apart from each other as possible since a determination or identification of the external object location can then more effectively be based on a triangulation using different antennas.

Different radio detection and ranging devices and/or receiving devices can be arranged in any combination within the outstations or clusters, e.g. a combination of medium range (MR), or long range (LR), or short range (SR) radio detection and ranging devices, or specific purpose radio detection and ranging devices such as man-over-board (MOB) radio detection and ranging devices. Any combination of these can be arranged within the outstations or clusters.

The communication within an outstation or cluster can be dependent of the sensor type. The medium range (MR) and long range (LR) radio detection and ranging devices can communicate e.g. using a Gbit Ethernet connection via an Ethernet switch. The structure of the communication network within an outstation or cluster can be adapted depending on sensor specifications and/or interaction specifications.

The system infrastructure on a maritime vessel can be adapted based on specifications, and/or available cable routes. An exemplary set-up may comprise a fiber in star connection between outstations or clusters and the central processing device. Furthermore, fiber rings or Ethernet CAT5/6 structures may be used. When possible, also wireless connection between outstations and/or clusters and the central processing device can be used. For example, WiFi and/or WiMax, e.g. in various combinations of available channels, may be used.

The radio detection and ranging devices, e.g. the active radar sensors, can be based on transmitting and receiving an electromagnetic wave or signal. They can perform a continuous transmission for a continuous update. They may also perform a frequent non-continuous chirp transmission for a continuous update. They can provide a measurement of range, angle of incidence and/or speed, e.g. via Doppler processing, and a measurement of sea clutter abnormalities. They can be multi-beam radio detection and ranging devices having a broad transmit beam and a plurality of narrow receive beams. They can be frequency-modulated continuous-wave (FMCW) radio detection and ranging devices, frequency-stepped continuous wave (FSCW) radio detection and ranging devices, continuous-wave (CW) radio detection and ranging devices or pulse radio detection and ranging devices.

The receiving devices, e.g. the passive radar receiving devices, can be used for direction finding. They can be based on receiving an electromagnetic wave or signal directly from a further object, transmitter, or signal source. They can provide a measurement of an angle of incidence, and a measurement of transmitter or source characteristics. A detection of multiple objects can be performed simultaneously by time stamping.

The receiving devices, e.g. the passive radar receiving devices, can be used for time difference of arrival estimation. They can be based on receiving an electromagnetic wave or signal from a remote signal source and a reflected electromagnetic wave or signal from the further object. They can provide a measurement of range, angle of incidence, and speed.

The antennas of the radio detection and ranging devices and receiving devices can be phased array receiving antennas. They can be dual- or multi-transmit antennas for a wide sector and long range. They can be sector antennas for a full angular coverage. They can be multi-station antennas.

The synchronization can be a time synchronization, a frequency synchronization, and/or a phase synchronization. Local oscillators and/or analog-digital-converters of the radio detection and ranging devices and/or receiving devices can be synchronized. The synchronization source can be GNSS-based or wire or local central source-based. The structure of the communication network or synchronization network, the synchronization scheme within the outstations or clusters, and the synchronization scheme of the overall system can depend on the type of the devices or sensors.

For passive radio receiving devices, the synchronization can directly be related to an angular and radial accuracy performance of the system 100. A pre-processing can be performed at the outstation or cluster. For the active radio detection and ranging devices, the synchronization can be employed for reduction of interference and for tracking of objects across beams, outstations or clusters.

The system 100 can achieve an increased angular and temporal resolution when compared with known approaches.

Furthermore, the system 100 can detect MetOcean parameters, e.g. an ocean wave spectrum, a wave period, a wave propagation direction, a wave propagation speed, a wave height, a wind speed, a wind direction, an ocean current speed, an ocean current direction, a sea ice floe, and/or a sea ice concentration. The system 100 can provide a high sensitivity to Doppler signatures. Falling objects, e.g. a person or multiple persons falling overboard, can be detected, characterized and tracked.

The synchronization of the radio detection and ranging devices and/or receiving devices can enable a coherent processing of the sensor signals between the outstations or clusters.

Each of the outstations or clusters can check its own behavior and can detect performance deviations indicating damage or degraded behavior. The central processing device can also check its own behavior and the behavior of other networked system or device components, and can detect deviations indicating the damage or degraded behavior of the central processing device and of other system components. For example, detection results of two outstations or clusters that perform comparable situation observations can be compared to each other to detect a potential degradation. An indication of the resulting system health can be used to reconfigure the system, the object detection, and/or the object detection process.

Medium range (MR) radio detection and ranging devices, man-over-board (MOB) radio detection and ranging devices, and passive very long-range receiving devices can exemplarily be employed. The mentioned three type combination, however, is an example of many different type combinations that can be utilized.

For example, radio detection and ranging devices for off-loading and/or on-loading of goods to and/or from a supply maritime vessel to an offshore platform can be employed. Furthermore, radio detection and ranging devices for specifically observing the maritime environment, e.g. for determining a full wave spectrum or a geostrophic and advective ocean current, can be used. Furthermore, radio detection and ranging devices can be used for dynamic positioning.

Moreover, radio detection and ranging devices for observing non-ship bridge visible sectors around the maritime vessel can be employed, e.g. if there are shadowed areas around the maritime vessel being not visible from the bridge of the maritime vessel due to its superstructure or other structures exposing blind zones. Furthermore, radio detection and ranging devices for aiding a dynamic positioning of the maritime vessel in relation to external objects, e.g. offshore platforms, piers, docks, Floating Production Storage and Offloading (FPSO) units, offloading buoys, and/or pipe-systems, can be employed.

The research leading to these results has received funding from the European Union's Seventh Framework Programme FP7/2007-2013 under grant agreement no 315282.

REFERENCE LIST

100 System for monitoring a maritime environment
101-105 Radio detection and ranging device
107 Communication network
109 Synchronization source
111 Processing device
200 Method for monitoring a maritime environment
201 Generating a synchronization signal
203 Providing the synchronization signal
205 Receiving the synchronization signal
207 Synchronizing an operation of each radio detection and ranging device
209 Performing a synchronous detection of an object in the maritime environment
211 Transmitting a plurality of sensor signals
213 Receiving the plurality of sensor signals
215 Determining the location of the object in the maritime environment
300A Diagram
300B Diagram
301 Object
303 Maritime vessel
401-411 Surveillance radio detection and ranging device
413-427 Man-over-board radio detection and ranging device
429-435 Passive radio receiving device
437 Fiber switch/hub
439 Central processing and presentation device

The invention claimed is:

1. A system for monitoring a maritime environment, the system comprising:
   a plurality of radio detection and ranging devices being configured to perform a synchronous detection of an object in the maritime environment, to transmit a plurality of sensor signals respectively relating to a location of the object in the maritime environment over a communication network, and to receive a synchronization signal, each of the radio detection and ranging devices being configured to synchronize its operation according to the synchronization signal;
   a synchronization source being configured to generate the synchronization signal for synchronizing operations of the plurality of radio detection and ranging devices, and to provide the synchronization signal over the communication network to the plurality of radio detection and ranging devices; and
   a processing device being configured to receive the plurality of sensor signals from the plurality of radio detection and ranging devices, and to determine the location of the object in the maritime environment upon the basis of the plurality of sensor signals;
   wherein the plurality of radio detection and ranging devices comprises a surveillance radio detection and ranging device and a man-over-board radio detection and ranging device;
   wherein the surveillance radio detection and ranging device and the man-over- board radio detection and ranging device are arranged to form an outstation or a cluster; and
   wherein a first radio detection and ranging device of the plurality of radio detection and ranging devices is configured to provide a first sensor signal, wherein a second radio detection and ranging device of the plurality of radio detection and ranging devices is configured to provide a second sensor signal, and wherein the first radio detection and ranging device or the second radio detection and ranging device is configured to combine the first sensor signal with the second sensor signal.

2. The system of claim 1, wherein each of the radio detection and ranging devices is configured to synchronously generate a transmit signal upon the basis of the synchronization signal, to transmit the transmit signal towards the object in the maritime environment, to receive a reflected signal, the reflected signal forming a reflected version of the transmit signal, and to generate a sensor signal upon the basis of the transmit signal and the reflected signal.

3. The system of claim 2, wherein each of the radio detection and ranging devices is configured to determine a Doppler frequency shift between the transmit signal and the reflected signal, and to generate the sensor signal upon the basis of the determined Doppler frequency shift.

4. The system of claim 1, wherein the plurality of radio detection and ranging devices is arranged to continuously monitor a predetermined azimuth range and to perform the synchronous detection of the object in the maritime environment within the predetermined azimuth range.

5. The system of claim 4, wherein the predetermined azimuth range comprises an azimuth range of 360°.

6. The system of claim 1, wherein the synchronization source comprises a global navigation satellite system (GNSS) receiver, a local oscillator, or a combination thereof, for generating the synchronization signal.

7. The system of claim 1, wherein the synchronization signal indicates a reference time, a reference frequency, or a reference phase, and wherein each of the radio detection and ranging devices is configured to synchronize its operation with regard to the reference time, the reference frequency, or the reference phase.

8. The system of claim 1, wherein the processing device is configured to determine a meteorological or oceanographic parameter of the maritime environment upon the basis of the plurality of sensor signals.

9. The system of claim 8, wherein the meteorological or oceanographic parameter of the maritime environment comprises an ocean current speed, an ocean current direction, an ocean wave height, an oceanwave period, an ocean wave frequency, an oceanwave direction of propagation, an ocean wave spectrum, a wind speed, or a wind direction.

10. The system of claim 1, wherein the processing device is configured to combine the plurality of sensor signals using a state estimation filter to determine the location of the object in the maritime environment.

11. The system of claim 10, wherein the state estimation filter comprises a Kalman filter or a particle filter.

12. The system of claim 1, wherein the processing device is configured to detect a malfunction of a radio detection and ranging device of the plurality of radio detection and ranging devices upon the basis of the plurality of sensor signals, and to generate an indicator signal indicating the malfunction of the radio detection and ranging device.

13. The system of claim 1, further comprising:
a plurality of receiving devices being configured to perform a synchronous reception of an electromagnetic signal originating from a further object in the maritime environment, to transmit a plurality of receiving signals respectively relating to a location of the further object in the maritime environment over the communication network, and to receive a further synchronization signal, each of the receiving devices being configured to synchronize its operation according to the further synchronization signal;
wherein the synchronization source is configured to generate the further synchronization signal for synchronizing operations of the plurality of receiving devices, and to provide the further synchronization signal over the communication network to the plurality of receiving devices; and
wherein the processing device is configured to receive the plurality of receiving signals from the plurality of receiving devices, and to determine the location of the further object in the maritime environment upon the basis of the plurality of receiving signals.

14. The system of claim 13, wherein a first receiving device of the plurality of receiving devices is configured to provide a first receiving signal, wherein a second receiving device of the plurality of receiving devices is configured to provide a second receiving signal, and wherein the processing device is configured to determine a time difference between a reception of the electromagnetic signal by the first receiving device and a reception of the electromagnetic signal by the second receiving device upon the basis of the first receiving signal and the second receiving signal.

15. The system of claim 1, further comprising:
a further radio detection and ranging device being configured to perform a detection of the object in the maritime environment, and to transmit a further sensor signal relating to the location of the object in the maritime environment over the communication network;
wherein the processing device is configured to receive the further sensor signal from the further radio detection and ranging device, and to determine the location of the object in the maritime environment upon the basis of the further sensor signal.

16. A method for monitoring a maritime environment, the method comprising:
generating a synchronization signal by a synchronization source for synchronizing operations of a plurality of radio detection and ranging devices;
providing the synchronization signal over a communication network by the synchronization source to the plurality of radio detection and ranging devices;
receiving the synchronization signal by the plurality of radio detection and ranging devices;
synchronizing an operation of each of the radio detection and ranging devices according to the synchronization signal;
performing a synchronous detection of an object in the maritime environment by the plurality of radio detection and ranging devices;
transmitting a plurality of sensor signals respectively relating to a location of the object in the maritime environment over the communication network by the plurality of radio detection and ranging devices;
receiving the plurality of sensor signals from the plurality of radio detection and ranging devices by a processing device; and
determining the location of the object in the maritime environment upon the basis of the plurality of sensor signals by the processing device;
wherein the plurality of radio detection and ranging devices comprises a surveillance radio detection and ranging device and a man-over-board radio detection and ranging device;

wherein the surveillance radio detection and ranging device and the man-over-board radio detection and ranging device are arranged to form an outstation or a cluster; and wherein a first radio detection and ranging device of the plurality of radio detection and ranging devices is configured to provide a first sensor signal, wherein a second radio detection and ranging device of the plurality of radio detection and ranging devices is configured to provide a second sensor signal, and wherein the first radio detection and ranging device or the second radio detection and ranging device is configured to combine the first sensor signal with the second sensor signal.

17. A system for monitoring a maritime environment, the system comprising:

a plurality of radio detection and ranging devices being configured to perform a synchronous detection of an object in the maritime environment, to transmit a plurality of sensor signals respectively relating to a location of the object in the maritime environment over a communication network, and to receive a synchronization signal, each of the radio detection and ranging devices being configured to synchronize its operation according to the synchronization signal;

a synchronization source being configured to generate the synchronization signal for synchronizing operations of the plurality of radio detection and ranging devices, and to provide the synchronization signal over the communication network to the plurality of radio detection and ranging devices; and a processing device being configured to receive the plurality of sensor signals from the plurality of radio detection and ranging devices, and to determine the location of the object in the maritime environment upon the basis of the plurality of sensor signals;

wherein a first radio detection and ranging device of the plurality of radio detection and ranging devices is configured to provide a first sensor signal, wherein a second radio detection and ranging device of the plurality of radio detection and ranging devices is configured to provide a second sensor signal, and wherein the first radio detection and ranging device or the second radio detection and ranging device is configured to combine the first sensor signal with the second sensor signal.

* * * * *